_3,325,264_
METHOD OF MAKING A MOLTEN FOAMED GLASS
William E. Marceau, Havertown, Pa., assignor to Selas Corporation of America, a corporation of Pennsylvania
No Drawing. Filed Sept. 28, 1964, Ser. No. 399,898
7 Claims. (Cl. 65—22)

The present invention relates to foam glass, and more particularly to a method of making foam glass having a uniformly small cellular structure and with a low specific gravity.

Cellular or foam glass has been used for heat and sound insulation. It has the advantages of being impervious to vermin and moisture as well as being light in weight. Glass of this type is formed by mixing a gas producing or foaming agent with either cullet or molten glass and heating them so that the foaming agent produces small bubbles that are trapped in place in the glass.

It is an object of the present invention to provide an improved method of making foam glass. It is a further object of the invention to provide a method of making foam glass in which the cells thereof are of a substantially uniform size and are distributed uniformly throughout the mass.

In practicing the invention, the starting material can be either glass batch or cullet, depending upon the facilities that are available. If batch is used, it is melted in the usual manner to form liquid glass. If cullet is used, the cullet is placed in a furnace and melted. In either case the glass is heated to a temperature of approximately 1850° F., at which temperature the glass is sufficiently fluid so that a foaming agent can readily be mixed with it.

The preferred foaming agent is manganese dioxide, $MnO_2$, which will decompose to release oxygen at temperatures of from 1900°–2000° F. Other materials such as cobalt oxide may also be used as a foaming agent because of their relatively high decomposition temperature. $MnO_2$ is mixed with the liquid glass in amounts of from 1% to 15% by weight, and preferably from 2.5% to 5%. The glass at the temperature noted above is sufficiently fluid for thorough mixing to take place, and at that temperature a good proportion of the $MnO_2$ appears to go into solution. If cullet is used as the starting material, the $MnO_2$ in granular form, can be mixed with it prior to melting, and thus avoid the necessity of stirring the liquid glass.

The glass with the foaming agent in it is then raised in temperature to from 1900°–1975° F., at which temperature the $MnO_2$ will decompose to release oxygen. As this gas is released throughout the mass of glass, it will produce small bubbles uniformly. The size to which the bubbles will grow, and therefore the form of the cellular structure, will depend upon the time that the glass is maintained at a given high temperature with consequent low viscosity. When the bubbles have reached the desired size, the temperature of the glass is rapidly lowered to about 1400° F., which is below the above mentioned decomposition temperature of $MnO_2$ so that the viscosity of the glass is increased to a point where the pressure of the gas in the bubbles is no longer sufficient to expand them but the glass is still liquid enough to pour. The foam glass can then be poured into moulds of any desired shape, where it will harden. In some cases, the glass can be placed in moulds prior to the final heating and cooling so that the foaming will take place in the moulds. After annealing the glass is ready for use.

Generally speaking, the lower the temperature of the glass during decomposition of the foaming agent the better, since there is less likelihood of rupture of the glass walls of the bubbles.

Another way for controlling the size of the cells or bubbles in the glass is to melt the glass and decompose the foaming agent under pressure, then release the pressure. Expansion of the cells will depend upon the temperature of the glass and the pressure differential.

In following this procedure, glass containing $MnO_2$ is prepared in the above described manner. While the glass is still below the decomposition temperature of the $MnO_2$, it is charged into a high temperature, high pressure vessel. The glass is then heated to from 2200° to 2300° F., or above the decomposition temperature, at which time small gas bubbles are formed throughout the mass. The higher temperature is required, in this case, since decomposition of the $MnO_2$ is retarded because of the increase in pressure. After the gas bubbles are formed the temperature of the mass is reduced as indicated above to stop foaming and to increase the viscosity of the glass while leaving it liquid enough to pour. The glass is then placed in suitable moulds at atmospheric pressure, preferably from a port provided in the pressure vessel. As the glass moves from the pressure vessel, the bubbles will expand an amount depending upon the temperature of the glass and the pressure in the tank. The tank will be kept under a pressure of from 20 to 90 pounds per square inch gauge and preferably about 60 pounds.

Many types of glass can be used in following the invention. The method, however, is particularly suited for use with ordinary window or container glass batch or cullet. In using such glass, it is melted and heated to decomposition temperature for the $MnO_2$. The mass is then cooled down to from 1400° to 1450° F. after the expansion of the bubbles takes place.

Glass made according to the present method, and held at temperature between 5 and 15 minutes for bubble expansion to take place, will have a specific gravity of from 0.95 to 0.2. The individual bubbles or cells are substantially uniform in size throughout the mass and are about $\frac{1}{16}''$ in diameter, and are separated from each other by a thin wall of glass.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of making glass foam which comprises melting glass with a foaming agent distributed substantially uniformly throughout its mass by heating the glass to a temperature below the decomposition temperature of the foaming agent, said foaming agent being characterized by releasing a gas upon decomposition thereof, heating the melted glass to a temperature at least equal to the decomposition temperature of the foaming agent thereby to release gas substantially uniformly throughout the mass of glass in the form of small bubbles, the bubbles increasing in size due to expansion by the heat of the mass, reducing the temperature of the glass below the decomposition temperature of the foaming agent and until its viscosity is sufficient to overcome the tendency for the bubbles created by the foaming agent to increase in size, and while the glass is still molten pouring the glass into a mould and chilling it.

2. The method of making foam glass which comprises melting glass to a temperature below that of a foaming agent to be added, adding MnO₂ as a foaming agent to the glass, thoroughly mixing the MnO₂ in the liquid glass, raising the temperature of the glass to above the decomposition temperature of the MnO₂ thereby to release oxygen in the form of small bubbles throughout the mass of glass, reducing the temperature of the glass below the decomposition temperature of the MnO₂ thereby to stop bubble formation and retard growth in size of the bubbles, and while the glass is still molten pouring the glass into a mould.

3. The method of claim 2 in which the foaming agent is introduced in an amount of from 1.5% to 10% by weight of the glass.

4. The method of making foam glass which comprises raising the temperature of the glass to melt it, mixing with the glass a foaming agent which will decompose and release a gas at a higher temperature than that required to melt the glass, raising the temperature of the glass and foaming agent to a temperature above that at which the foaming agent will decompose to release gas throughout the glass to form bubbles, maintaining the glass at temperature until the bubbles have reached the desired size, lowering the glass temperature until it is below the decomposition temperature of the foaming agent and its viscosity is high enough so that the pressure of the gas in the bubbles is no longer sufficient to expand them, placing the glass at said lowered temperature and while it is still molten in a mould and cooling the glass to harden it.

5. The method of claim 4 in which the foaming agent is MnO₂.

6. The method of making foam glass which comprises heating glass to about 1850° F. so that it is sufficiently fluid for a foaming agent to be mixed with it, mixing MnO₂ with the fluid glass, raising the temperature of the glass to 1900° F. to 2000° F. whereby the MnO₂ will decompose thereby to release gas in the form of small bubbles throughout the glass, holding the glass at the last mentioned temperature so that the bubbles will expand, reducing the glass temperature below the decomposition temperature of the MnO₂ and to about 1450° F. to increase its viscosity and thereby stop growth of the bubbles, placing the glass while it is still molten in moulds and cooling the glass to harden it.

7. The method of claim 6 in which the MnO₂ is from 1% to 15% by weight of the glass.

References Cited

UNITED STATES PATENTS

| | | | |
|---|---|---|---|
| 2,156,457 | 5/1939 | Long | 65—22 |
| 2,215,223 | 9/1940 | Lytle | 65—22 |
| 2,264,246 | 11/1941 | Lytle | 65—22 |
| 2,322,581 | 6/1943 | Lytle | 65—22 |
| 3,207,588 | 9/1965 | Slayter et al. | 65—22 |

DONALL H. SYLVESTER, *Primary Examiner.*

G. R. MYERS, *Assistant Examiner.*